Dec. 25, 1928.
W. M. BROWER
1,696,380
INSTRUMENT CONTROL
Filed March 29, 1926
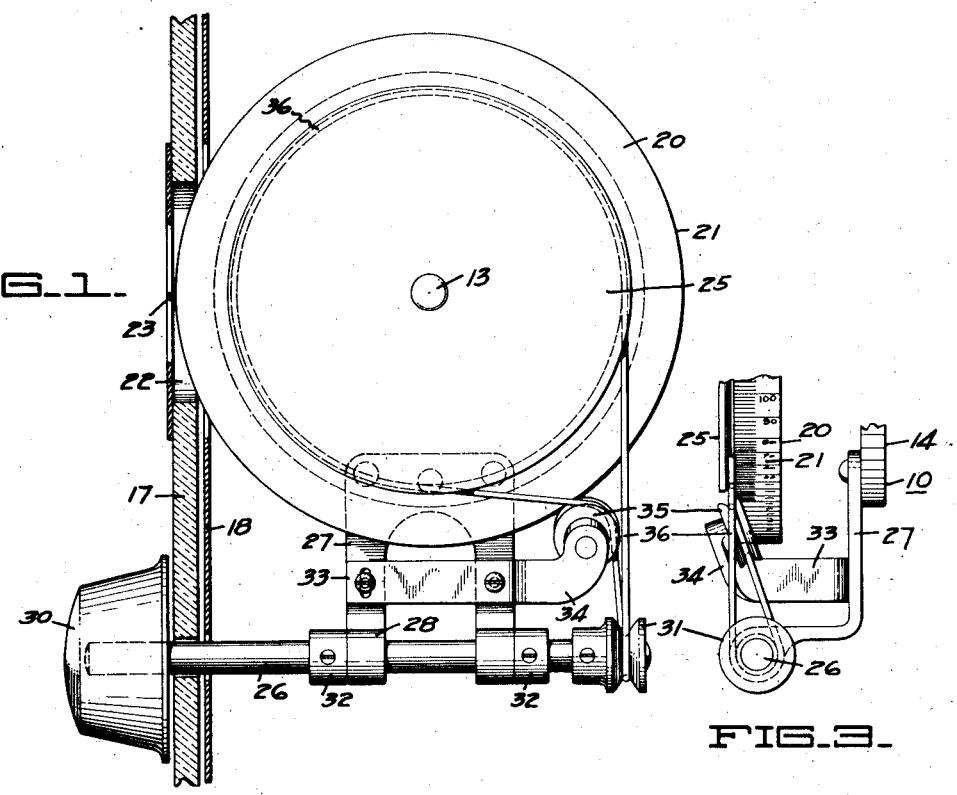
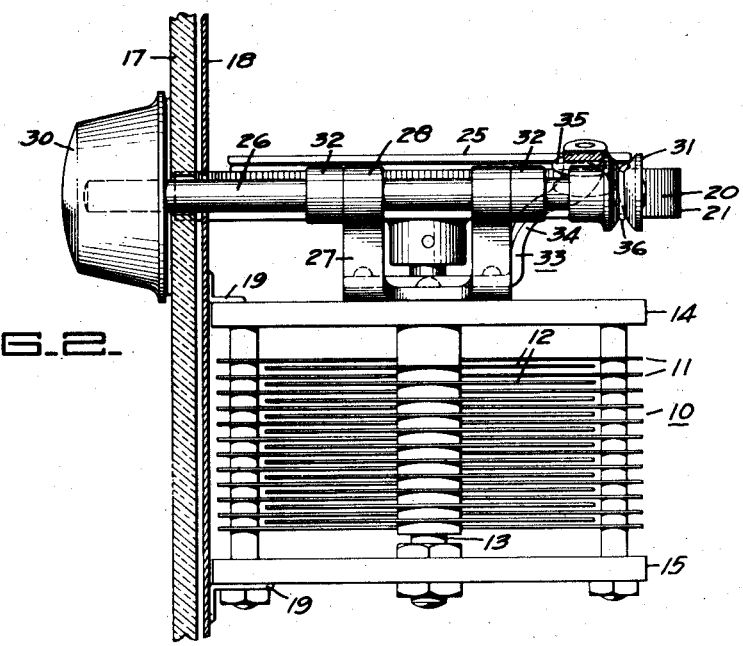
INVENTOR
William M. Brower
BY White & Prost
his ATTORNEYS Patented Dec. 25, 1928.

1,696,380

UNITED STATES PATENT OFFICE.

WILLIAM M. BROWER, OF PALO ALTO, CALIFORNIA, ASSIGNOR TO FEDERAL TELEGRAPH COMPANY, OF SAN FRANCISCO, CALIFORNIA, A CORPORATION OF CALIFORNIA.

INSTRUMENT CONTROL.

Application filed March 29, 1926. Serial No. 98,308.

This invention relates generally to devices for controlling electrical instruments and has particular application in the radio art for controlling electrical tuning instruments such as variable condensers or variometers.

It is an object of this invention to devise a simple form of driving connection between the control shaft and the shaft of an electrical instrument which will permit accurate and smooth control of the instrument.

It is a further object of this invention to construct a control for a tuning instrument which will permit the positioning of the control shaft in alinement with the periphery of an indicating drum or dial provided upon the shaft of the instrument.

It is a further object of this invention to secure a novel arrangement for controlling the shaft of a tuning instrument adapted to be mounted behind an instrument panel. It is proposed to provide an indicating dial on the instrument shaft, the periphery of which is visible through an aperture in the panel and to operatively connect the instrument shaft to a control shaft arranged in vertical alinement with the indicating dial.

It is a further object of this invention to provide a combination indicating dial and pulley wheel on the shaft of an electrical tuning instrument, the pulley serving as a means for controlling the instrument.

Further objects of the invention will appear from the following description in which the preferred embodiment of the invention has been set forth. It is to be understood that various modifications may be made within the scope of the appended claims.

Referring to the drawings:

Figure 1 is a side view showing the invention as applied to a tuning instrument mounted behind an instrument panel.

Fig. 2 is a plan view of the invention as shown in Fig. 1, the instrument panel being shown in cross section.

Fig. 3 is a detail view showing the resilient means for tensioning and tracking the driving belt.

In radio apparatus it is necessary to make very close adjustments of the various tuning instruments such as variometers or variable condensers. Manual control means must be provided which will permit very small angular movement of the control shaft and this control should be smooth at all times; that is, it should not have any back-lash or lost motion. In the past it has been proposed to employ gear trains or friction wheels but these mechanisms have not proved altogether successful in securing the desired smoothness of operation and have also been expensive to manufacture. My invention solves this problem by employing a simple form of belt drive which in addition to securing smoothness of operation will also permit the control shaft to be positioned in alinement with the periphery of an indicating dial. It is also proposed to mount the control mechanism directly upon the tuning instrument so that the instrument with its control may be removed or applied as a unit to an instrument panel.

Referring to the drawings there is shown an electrical tuning instrument 10 such as a variable condenser having the usual stator plates 11 and rotor plates 12, the rotor plates being mounted upon a rotatable shaft 13. Suitable means such as a pair of end plates 14 and 15 serve to retain the rotor and stator plates in assembled relation. The variable condenser is adapted to be mounted behind an instrument panel 17 preferably with its shaft 13 in horizontal position. Thus the condenser has been shown as secured to a metal sheet 18 by suitable means such as bracket 19, the sheet 18 being positioned immediately behind the panel 17. Secured adjacent one end of the shaft 13 there is an indicating drum or dial 20 having a peripheral portion 21 which is provided with suitable graduations. The peripheral portion 21 is preferably of sufficient diameter to extend through an aperture 22 provided in the panel 17 so as to be viewed from the front of the panel. A stationary indicia 23 may be provided on the panel for cooperating with the dial so that an operator may set the instrument to any desired position.

To control the movement of the shaft 13 there is provided a pulley wheel 25 which is preferably secured to the dial 20. In the construction shown a combination dial and pulley wheel is employed which is constructed of a single integral piece of suitable material, such as fibre or a phenolic condensate product. Adjacent the dial there is mounted a rotatable control shaft 26, this shaft being disposed in a plane normal to the shaft 13 and central of the peripheral portion 21. Thus the control shaft may be said to be in vertical alinement with the periphery of the dial. For retaining shaft 26 in operative position a bracket 27 is mounted on the end plate 14, this bracket carrying journal members 28. One end of the shaft 26 is adapted to project through the panel 17 and is provided with a control knob 30 while the other end has secured thereto a relatively small pulley wheel 31. Collars 32 may be secured to the shaft 26 adjacent the journal member 28 to prevent longitudinal movement of the control shaft. Secured to the bracket 27 there is a resilient metal strip 33 having its one end extended and bent outwardly to form a spring arm 34 which carries an idler pulley 35. Entrained around the pulleys 25 and 31 there is a flexible belt or cord 36 which also passes over the idler pulley 35, this latter pulley being positioned in the manner shown in Fig. 3 so as to track the belt 36 upon the two pulleys. The resilient arm 34 serves to press the idler pulley in a direction to tension the belt 36.

In operation comparatively large angular movement of the control knob 30 will effect small angular movement of the instrument shaft 13, because of the difference in size between the pulley wheels 25 and 31. Furthermore, because of the use of a flexible tensioned drive the control is perfectly smooth and free from all uneven and jerky movements. Upon reversal of the direction of movement there will be no back-lash or lost motion. The positioning of the shaft in vertical alinement with the indicating dial, which is made possible through the use of this particular driving connection, materially facilitates manipulation of the device by an operator. As the entire control is secured to the variable condenser it may be conveniently removed or attached to the panel as a unit merely by removing the knob 30 so as to permit the control shaft 26 being removed or inserted through the panel.

This case is a continuation in part of my application Serial Number 753,653, filed December 3, 1924.

I claim:

1. In a visual indicator of the class described the combination with a panel formed with an opening therein, a rotatable shaft, an indicator drum secured to said shaft and having graduations thereon visible through the opening in said panel, a rotatable control shaft in alignment with said indicator drum, and flexible means for operatively connecting said shafts, said means extending in planes substantially at right angles to each other.

2. In a visual indicator of the class described an electrical tuning device having a rotatable shaft, an instrument panel having an aperture therein, means for operatively mounting said device adjacent said instrument panel with the shaft in spaced parallel relationship behind said panel, an indicting drum secured to said shaft and having a portion of its periphery visible through the aperture in said panel, a control shaft projecting through said panel and normal to the same, said control shaft lying in a plane normal to said first shaft and central of said drum, and means operatively connecting said shafts for driving said drum in accordance with movement imparted to said control shaft from the front of said panel.

3. In a visual indicator of the class described an electrical tuning device having a rotatable shaft, an indicator drum secured to said shaft, a pulley wheel secured to the shaft adjacent the indicator drum, a rotatable control shaft disposed normal to said first named shaft and aligned with said drum, a pulley on said last named shaft, and a belt operatively connecting said pulleys, said belt being twisted from the plane of said indicator drum to the plane of the pulley on said last named shaft whereby motion imparted to said control shaft causes corresponding movement of said drum.

4. In a visual indicator of the class described an electrical tuning device having a rotatable shaft, an instrument panel having an aperture therein, means for operatively mounting said device adjacent an instrument panel, an indicating drum secured to said shaft and having a portion of its periphery visible through the aperture in said panel, a control shaft projecting through said panel in vertical alignment with said aperture, and a flexible belt operatively connecting said control shaft and said first named shaft, said belt being twisted from a plane parallel to a central plane through said indicating drum to a plane normal to the axis of said control shaft.

5. In a visual indicator of the class described an electrical instrument having a shaft rotatable to vary the electrical properties of the same, means for mounting said instrument behind an instrument panel with said shaft in horizontal position, an indicating drum secured to said shaft and having a portion of its periphery projecting through an aperture in said panel, a control shaft normal to said first named shaft and in vertical alignment with the center of the periphery of said drum, and means operatively connecting said shafts whereby said instrument shaft may be controlled by rotation of the control shaft from a position adjacent the projecting portion of said indicating drum.

6. In a visual indicator of the class described an electrical tuning instrument having a rotatable shaft for varying the same, a rotatable drum having peripheral graduations secured to said shaft, a pulley formed integrally with one face of said drum, a control shaft normal to said instrument shaft and in alignment with the center of said drum, said latter shaft having a relatively small pulley wheel, and a flexible belt operatively connecting said shafts whereby motion imparted to said control shaft causes corresponding movement to said rotatable drum.

7. In a visual indicator of the class described an electrical tuning instrument mounted behind an instrument panel and having a rotatable shaft for varying the same, a rotatable drum having peripheral graduations secured to said shaft and visible through an aperture formed in said panel, a pulley formed on one face of said drum, a control shaft normal to said instrument shaft and in alignment with the center of said drum, said latter shaft having a relatively small pulley wheel, a flexible belt operatively connecting said pulleys and spring means for tensioning and tracking said belt upon said pulleys, said control shaft being operable from the front of said panel.

8. In a visible indicator of the class described an electrical instrument having a rotatable shaft for varying the same, a rotatable control shaft mounted upon said electrical instrument and disposed normal to said instrument shaft, a pulley wheel on said control shaft, a dial having a circumferential graduated portion, said dial being secured to said shaft with the circumferential portion bisected by a plane normal to said instrument shaft and including said control shaft, a pulley wheel secured to one face of said dial, and flexible means operatively connecting said control shaft and pulley wheel, said means twisting from one plane to another in the course of travel of said flexible means between said pulley wheels.

9. In a visible indicator of the class described an electrical instrument having a rotatable shaft for varying the same, a rotatable control shaft mounted upon said electrical instrument and disposed normal to said instrument shaft, a combination indicating dial and pulley wheel secured to said shaft, said dial having a peripheral graduated portion of greater diameter than the pulley wheel portion and being disposed in a plane normal to the instrument shaft and including the control shaft, a pulley on the control shaft, and a flexible belt operatively connecting the pulley wheel on the control shaft and the pulley wheel portion of said dial, said belt changing its direction in the course of its travel from one pulley wheel to the other.

In testimony whereof, I have hereunto set my hand.

WILLIAM M. BROWER.